(12) United States Patent
Oda et al.

(10) Patent No.: US 12,184,096 B2
(45) Date of Patent: Dec. 31, 2024

(54) POWER SUPPLY SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kota Oda, Yokkaichi (JP); Yasuyuki Yamamoto, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 517 days.

(21) Appl. No.: 17/753,153

(22) PCT Filed: Aug. 27, 2020

(86) PCT No.: PCT/JP2020/032329
§ 371 (c)(1),
(2) Date: Feb. 22, 2022

(87) PCT Pub. No.: WO2021/039894
PCT Pub. Date: Mar. 4, 2021

(65) Prior Publication Data
US 2022/0376562 A1 Nov. 24, 2022

(30) Foreign Application Priority Data
Aug. 30, 2019 (JP) ................... 2019-158066

(51) Int. Cl.
*H02J 7/00* (2006.01)
*H02J 50/10* (2016.01)
*H02J 50/80* (2016.01)

(52) U.S. Cl.
CPC ............ *H02J 50/80* (2016.02); *H02J 7/0063* (2013.01); *H02J 7/007182* (2020.01); *H02J 50/10* (2016.02)

(58) Field of Classification Search
None
See application file for complete search history.

(56) References Cited

U.S. PATENT DOCUMENTS 5,890,779 A     4/1999   Blackburn et al.
2003/0030411 A1*   2/2003   Ayano ................. B60L 3/00
                                           320/109
(Continued)

FOREIGN PATENT DOCUMENTS

JP     2015-035838 A    2/2015

OTHER PUBLICATIONS

International Search Report, Application No. PCT/JP2020/032329, mailed Oct. 6, 2020. ISA/Japan Patent Office.

*Primary Examiner* — Arun C Williams
(74) *Attorney, Agent, or Firm* — Honigman LLP

(57) ABSTRACT

In a power supply system a power transmission unit capable of transmitting power supplied from a power supply; a transmission-side communication unit capable of communication; and a transmission-side control unit configured to control power transmission of the power transmission unit based on information communicated by the transmission-side communication unit, and a slidable object includes: a power receiving unit configured to contactlessly receive power from the power transmission coil; a determination unit configured to determine whether or not to transmit power from the power transmission coil to the power receiving unit; a receiving-side communication unit configured to transmit, to the transmission-side communication unit, information indicating a determination made by the determination unit as to whether or not to transmit power;

(Continued)

and a power storage unit configured to supply power to the determination unit and does not supply power to the load L.

16 Claims, 4 Drawing Sheets

(56) References Cited

U.S. PATENT DOCUMENTS

| | | | | |
|---|---|---|---|---|
| 2009/0096410 A1* | 4/2009 | Sakurai | ................... | B60L 58/20 |
| | | | | 320/109 |
| 2013/0076296 A1* | 3/2013 | Ushiroda | ............... | B60L 53/38 |
| | | | | 320/109 |
| 2015/0061576 A1* | 3/2015 | Chen | ....................... | B60L 53/37 |
| | | | | 320/108 |
| 2015/0236513 A1* | 8/2015 | Covic | .................... | H02J 50/12 |
| | | | | 307/104 |
| 2020/0251930 A1 | 8/2020 | Yamamoto | | |
| 2020/0346562 A1 | 11/2020 | Oda et al. | | |

* cited by examiner

POWER SUPPLY SYSTEM

CROSS-REFERENCE TO RELATED APPLICATIONS

This application is the U.S. national stage of PCT/JP2020/032329 filed on Aug. 27, 2020, which claims priority of Japanese Patent Application No. JP 2019-158066 filed on Aug. 30, 2019, the contents of which are incorporated herein.

TECHNICAL FIELD

The present specification discloses a technique that relates to a power supply system.

BACKGROUND

Conventionally, a technique for contactlessly supplying power is known. In JP 2019-77373A (JP 2019-77373A), a power supply system for a seat capable of sliding with respect to a vehicle body includes a power transmission coil provided in a floor portion of the vehicle body, and a power receiving coil fixed to the seat and capable of receiving power from the power transmission coil. In the seat, a power storage unit for storing power received by the power receiving coil, a seat-side control unit connected to an antenna unit for communication, and various electrical components are provided. The power storage unit is capable of supplying power to various electrical components and the seat-side control unit.

In the above configuration, the power storage unit provided in the seat supplies power to loads such as the electrical components. For this reason, the capacity of the power storage unit tends to increase in correspondence with power supplied to the electrical components, which is likely to make the configuration in the seat more complex. If, in contrast, the power storage unit is not provided in the seat, the configuration in the seat can be simplified. However, contactless power supply needs to be constantly performed to supply power to the loads. Therefore, there is a concern that power consumption and electromagnetic noise will increase.

SUMMARY

A power supply system described in the present specification is a power supply system for contactlessly supplying power supplied from a power supply, to a load in a slidable object capable of sliding with respect to a body of a vehicle, the body of the vehicle including: a power transmission unit capable of transmitting power supplied from the power supply; a transmission-side communication unit capable of communication; and a transmission-side control unit configured to control power transmission of the power transmission unit based on information communicated by the transmission-side communication unit, the slidable object including: a power receiving unit configured to contactlessly receive power from the power transmission unit; a determination unit configured to determine whether or not to transmit power from the power transmission unit to the power receiving unit; a receiving-side communication unit configured to transmit, to the transmission-side communication unit, information indicating a determination made by the determination unit as to whether or not to transmit power; and a power storage unit configured to supply power to the determination unit and does not supply power to the load.

Advantageous Effects of Invention

According to the technique described in the present specification, it is possible to simplify the configuration of the slidable object while suppressing the increase in power consumption and the occurrence of electromagnetic noise.

DETAILED DESCRIPTION OF PREFERRED EMBODIMENTS

Figure 1:
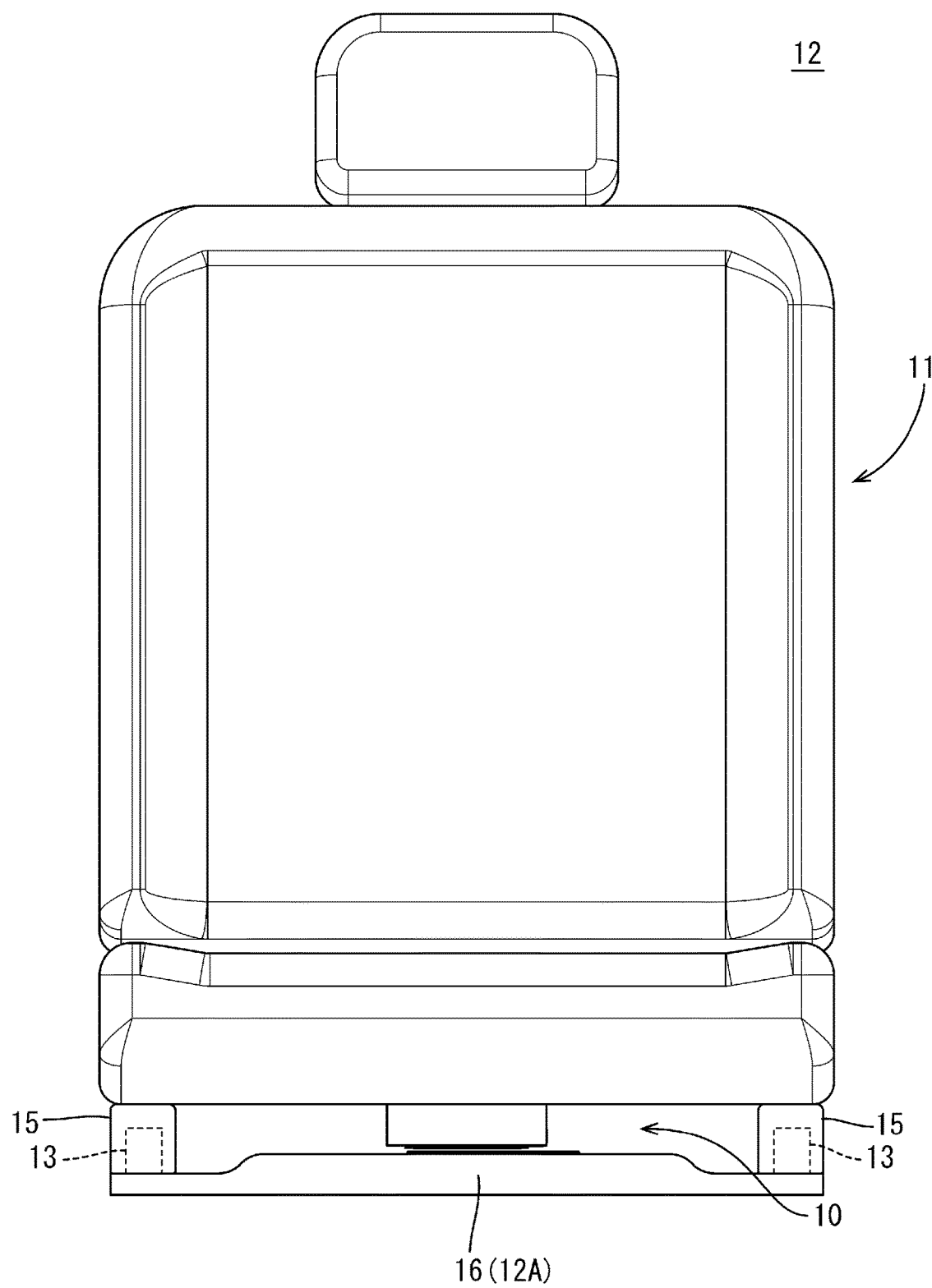
FIG. 1 is a front view of a power supply system that supplies power to a seat of a vehicle according to an embodiment.

Firstly, modes for carrying out the present disclosure will be listed and described.

A power supply system of the present disclosure is a power supply system for contactlessly supplying power supplied from a power supply, to a load in a slidable object capable of sliding with respect to a body of a vehicle, the body of the vehicle including: a power transmission unit capable of transmitting power supplied from the power supply; a transmission-side communication unit capable of communication; and a transmission-side control unit configured to control power transmission of the power transmission unit based on information communicated by the transmission-side communication unit, the slidable object including: a power receiving unit configured to contactlessly receive power from the power transmission unit; a determination unit configured to determine whether or not to transmit power from the power transmission unit to the power receiving unit; a receiving-side communication unit configured to transmit, to the transmission-side communication unit, information indicating a determination made by the determination unit as to whether or not to transmit power; and a power storage unit configured to supply power to the determination unit and does not supply power to the load.

According to the above configuration, the determination unit, to which power of the power storage unit is supplied, is capable of determining whether or not to transmit power, and power transmission is performed based on the result of this determination. With this configuration, contactless power supply does not necessarily need to be performed constantly, making it possible to reduce power consumption and suppress electromagnetic noise. Further, the slidable object does not need to be provided with a power storage unit with a relatively large capacity in order to drive the load, thus enabling the configuration of the slidable object to be simplified. Accordingly, it is possible to simplify the configuration of the slidable object while suppressing the increase in power consumption and the occurrence of electromagnetic noise.

The power storage unit supplies power to the determination unit and the receiving-side communication unit.

This configuration eliminates the necessity for contactless power supply for operating the receiving-side communication unit. Further, wireless communication can be easily performed with power of the power storage unit.

The slidable object further includes an operation unit capable of being operated by a user, and the determination unit determines whether or not to transmit power from the power transmission unit to the power receiving unit in accordance with an operation of the operation unit.

This configuration makes it possible to transmit power from the power transmission unit to the power receiving unit in accordance with an operation of the operation unit.

The power supply system further includes a voltage detection unit capable of detecting a voltage of the power storage unit, wherein the determination unit determines that power is to be transmitted from the power transmission unit to the power receiving unit when the voltage detection unit detects that the voltage of the power storage unit has dropped below a predetermined voltage.

This configuration is capable of suppressing malfunction due to the determination unit or other units stopping operating due to a voltage drop in the power storage unit.

The power storage unit stores power received by the power receiving unit.

This configuration is capable of suppressing the supply of power from the power storage unit to the load while allowing power to be stored in the power storage unit when power is transmitted from the power transmission unit to the power receiving unit.

The slidable object is a slide seat that is slidably fixed to the body of the vehicle.

Specific examples of the present disclosure will be described below with reference to the drawings. Note that the present disclosure is not limited to these examples but defined by the claims, and is intended to include all changes made within the meaning and scope equivalent to the claims.

An embodiment will be described with reference to FIGS. 1 to 4.

A power supply system 10 of the present embodiment is mounted in a vehicle 12 (FIG. 1 shows a part of the vehicle and omits the other part) such as an automobile, and supplies power to a load L, such as an electrical component, installed in a seat 11, which serves as a slidable object.

In the vehicle 12, a pair of rails 13 extending in the front-back direction is fixed onto a floor portion 16 of a body 12A as shown in FIG. 1. The seat 11 is capable of sliding in the front-back direction with respect to the pair of rails 13. A plurality of seats 11 are provided in the vehicle 12. Metal legs 15 are provided to a lower portion of each seat 11 in order to support the seat 11, and are capable of sliding in the front-back direction with respect to the rails 13. The load L provided in the seat 11 is, for example, any of motors for an electric sliding device and an electric reclining device, a seat heater, a display such as a touch panel, an air conditioner, a sensor for detecting whether or not an occupant is seated, a sensor for detecting whether or not the occupant is wearing a seat belt, and the like.

Power Supply System 10

Figure 2:
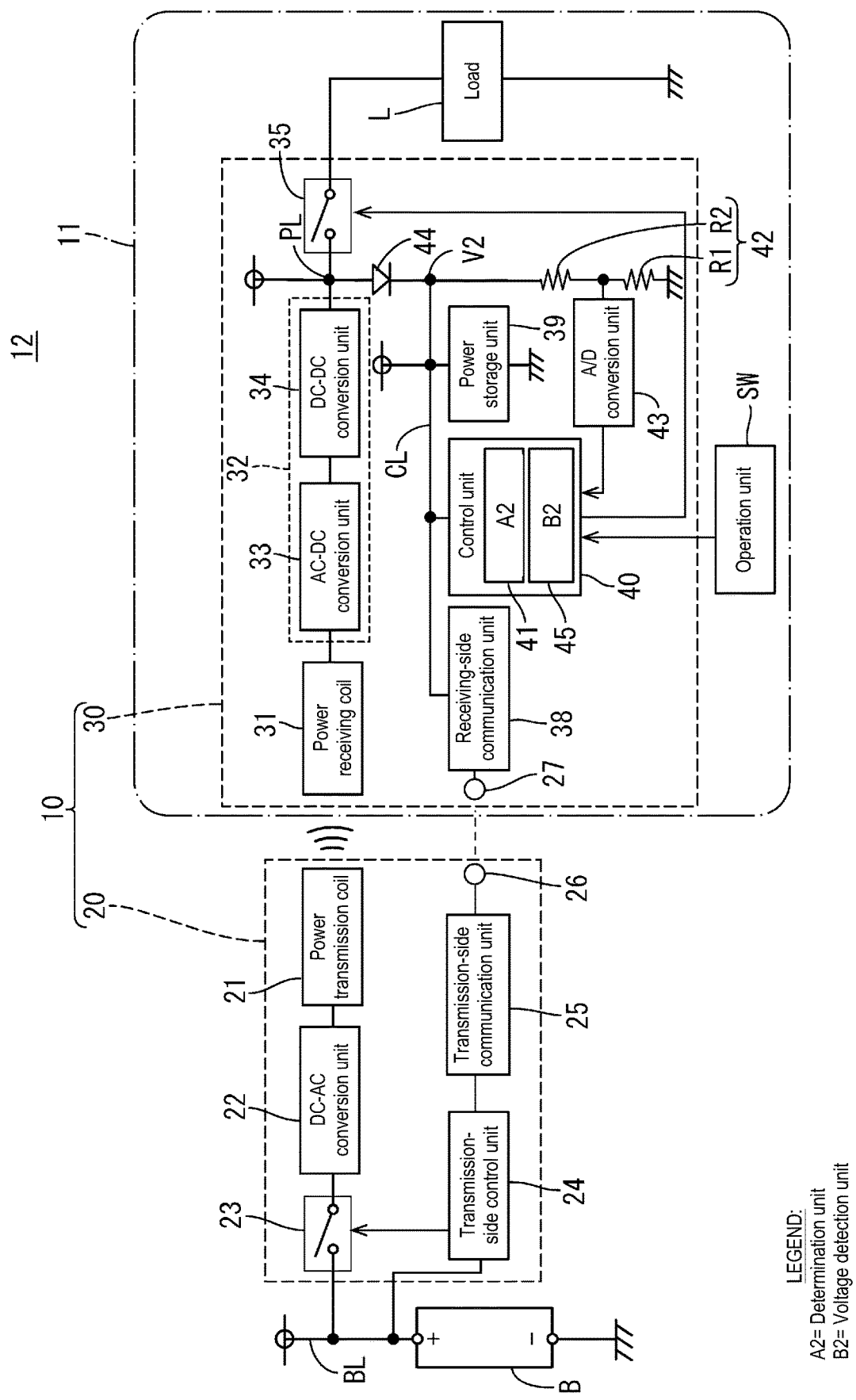
FIG. 2 shows an electrical configuration of the power supply system.
Figure 3:
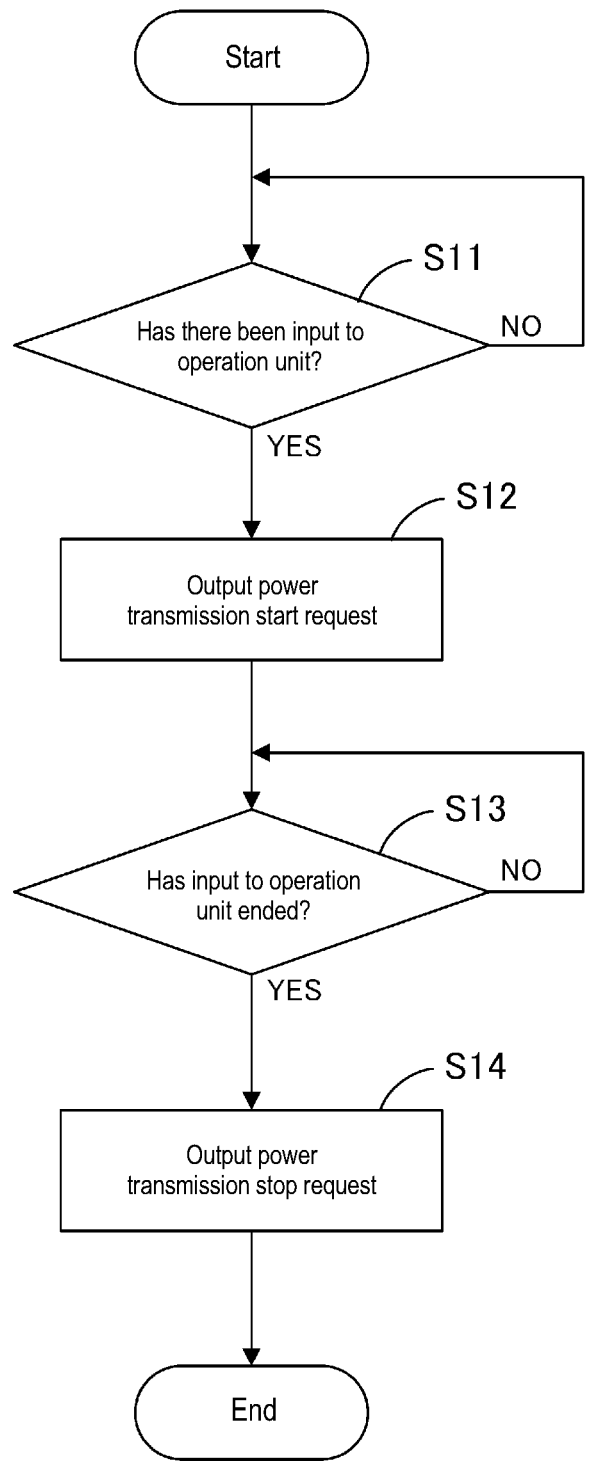
FIG. 3 is a flowchart illustrating processing performed by a control unit in accordance with an operation of an operation unit.
Figure 4:
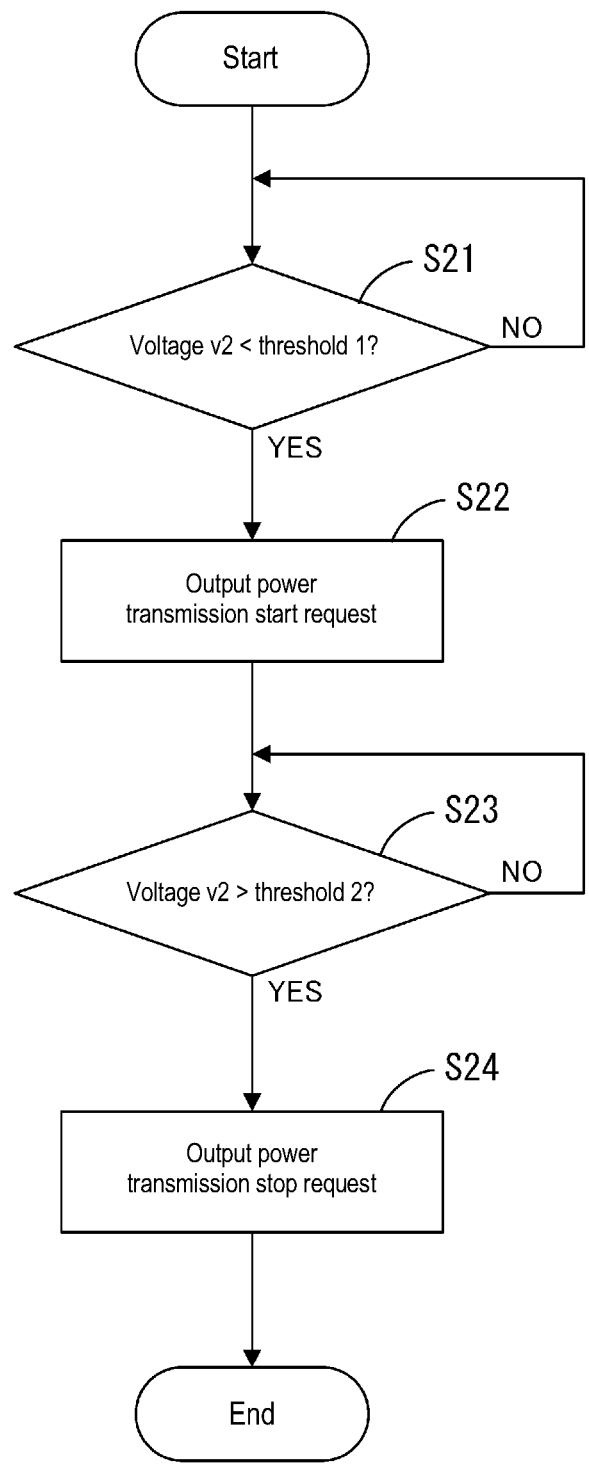
FIG. 4 is a flowchart illustrating processing performed by the control unit in accordance with voltage of a power storage unit.

As shown in FIG. 2, the power supply system 10 includes a power transmission device 20 that is fixed to the body 12A of the vehicle 12, and a power receiving device 30 that is fixed within the seat 11.

The power transmission device 20 is an ECU (Electronic Control Unit), for example, and is connected to a power supply B. The power supply B is a battery, an alternator, or the like of the vehicle 12, and has a positive electrode connected to a power supply line BL (e.g., 12 [V]) and a negative electrode connected to body ground of the vehicle 12. The power transmission device 20 includes a power transmission coil 21 (an example of a "power transmission unit"), a DC-AC conversion unit 22, a power switch 23, a transmission-side control unit 24, and a transmission-side communication unit 25.

The power transmission coil 21 is made of, for example, an electric wire that is an enamel-coated copper wire wound in a spiral shape. A DC-AC conversion unit 22 converts a DC voltage output from the power supply B into a high-frequency AC voltage. The power switch 23 is an electromagnetic switch, for example, and has a contact portion that opens and closes, and a coil portion that switches on and off the contact portion by being energized. The power switch 23 is connected between the positive electrode of the power supply B and the DC-AC conversion unit 22 (power conversion unit), and turns on and off the supply of power from the power supply B to the power transmission coil 21. The transmission-side control unit 24 switches on and off the contact portion by controlling the energization of the coil portion of the power switch 23. The transmission-side communication unit 25 is connected to an antenna unit 26, and is capable of receiving (communicating) information by means of wireless communication from the power receiving device 30 via the antenna unit 26.

The power receiving device 30 is an ECU (Electronic Control Unit), for example, and is connected to the load L in the seat 11 and an operation unit SW. The operation unit SW is provided in a user-operable area in the seat 11, such as an armrest, and can be operated to start or stop the operation of the load L, such as an electric slide device for sliding the seat 11, an electric reclining device, or a seat heater.

The power receiving device 30 includes a power receiving coil 31 (an example of a "power receiving unit"), a power conversion unit 32, and a power supply switch 35. The power receiving coil 31 is made of, for example, an electric wire that is an enamel-coated copper wire wound in a spiral shape, and is fixed at a position opposing the power transmission coil 21 on a lower face side of the seat 11, by means of a fixing means such as screwing or an adhesive.

The power conversion unit 32 converts power received by the power receiving coil 31, and includes an AC-DC conversion unit 33 for converting an AC voltage from the power receiving coil 31 to a DC voltage, and a DC-DC conversion unit 34 for converting the DC voltage to a DC voltage with a voltage value corresponding to the load L or the like. The power supply switch 35 is an electromagnetic switch, for example, and has a contact portion that opens and closes, and a coil portion that switches on and off the contact portion by being energized. The power supply switch 35 is connected in series to a power line PL (e.g., 12 [V]) between the output of the power conversion unit 32 and the load L, and turns on and off the supply of power from the power receiving device 30 to the load L.

The power receiving device 30 includes a receiving-side communication unit 38, a power storage unit 39, and a control unit 40.

The receiving-side communication unit 38 is connected to an antenna unit 37, and is capable of wireless communication with the power transmission device 20 via the antenna unit 37 and the antenna unit 26.

The power storage unit 39 is a small (small-capacity) storage battery for communication provided in the seat 11, and is, in this embodiment, a capacitor. Note that the power storage unit 39 is not limited to a capacitor, and may alternatively be a lithium-ion secondary battery or the like. Further, the power storage unit 39 is not limited to a secondary battery, and may alternatively be a primary battery (dry cell etc.). The power storage unit 39 is charged by receiving the supply of power from the power receiving coil 31. The power storage unit 39 is capable of supplying power to the control unit 40 and the receiving-side communication unit 38. The power storage unit 39 is connected in parallel to a voltage divider circuit 42 having a plurality of divider resistances R1 and R2. A divided voltage V1 of the voltage divider circuit 42 is converted to a digital signal by an A/D conversion unit 43 and is input to the control unit 40.

The control unit 40 is a CPU (Central Processing Unit), for example, and includes a voltage detection unit 45 for detecting a voltage V2 of the power storage unit 39 based on the input divided voltage V1, and a determination unit 41 for determining whether or not to transmit power from the power transmission coil 21 to the power receiving coil 31. The determination unit 41 determines whether or not to transmit power from the power transmission coil 21 to the power receiving coil 31 in accordance with an operation of the operation unit SW. When the voltage detection unit 45 detects that the voltage V2 of the power storage unit 39 has dropped below a predetermined voltage, the determination unit 41 determines that power is to be transmitted from the power transmission coil 21 to the power receiving coil 31. The control unit 40 is capable of transmitting a control signal to the power supply switch 35 for turning on and off the supply of power to the power line PL.

A control line CL of a predetermined voltage is formed between the antenna unit 37 and the power storage unit 39 in the power receiving device 30. The power line PL and the control line CL are connected by a power direction restriction unit 44. In the present embodiment, the power direction restriction unit 44 is a diode with an anode connected to the power line PL and a cathode connected to the control line CL. Power of the power line PL is supplied to the control line CL side but the supply of power in the opposite direction is regulated by the power direction restriction unit 44.

Processing performed by the control unit 40 will be described.

Processing Performed when the Operation Unit SW is Operated

The control unit 40 detects whether or not the operation unit SW has been operated ("NO" in S11). If it is detected that the operation unit SW has been turned on ("YES" in S11), the control unit 40 outputs a signal for requesting the start of power transmission to the receiving-side communication unit 38 (S12). Upon receiving the signal for requesting the start of power transmission, the receiving-side communication unit 38 transmits a signal for requesting the start of power transmission, to the transmission-side communication unit 25 via the antenna units 26 and 37. When information received by the transmission-side communication unit 25 is output to the transmission-side control unit 24, the transmission-side control unit 24 turns on the power switch 23. Thus, power is supplied from the power supply B to the power transmission coil 21, and power is supplied to the power line PL (and the control line CL) in the power receiving device 30 via the power transmission coil 21 and the power receiving coil 31.

Next, if the control unit 40 detects that the operation unit SW has been turned off ("YES" in S13), the control unit 40 outputs a signal for requesting a stop of power transmission to the receiving-side communication unit 38 (S14). Upon receiving the signal for requesting a stop of power transmission, the receiving-side communication unit 38 transmits a signal for requesting a stop of power transmission, to the transmission-side communication unit 25 via the antenna units 26 and 37. The transmission-side communication unit 25 turns off the power switch 23 via the transmission-side control unit 24. Thus, the supply of power from the power supply B to the power line PL (and the control line CL) in the power receiving device 30 via the power transmission coil 21 and the power receiving coil 31 is stopped.

Processing Performed when the Voltage of the Power Storage Unit 39 Drops

The control unit 40 calculates the voltage V2 of the power storage unit 39 (and the control unit 40 and the receiving-side communication unit 38) based on the divided voltage V1 input from the voltage divider circuit 42 and the ratio of the resistances R1 and R2. The control unit 40 then determines whether or not the calculated voltage V2 is smaller than a threshold 1 that is stored in advance in a memory of the control unit 40 (S21). Here, the threshold 1 is a value of the voltage with which the control unit 40 (the CPU thereof and the receiving-side communication unit 38) can operate (i.e., a value of a voltage that is slightly higher than the voltage at which the CPU stops operating). If the control unit 40 determines that the voltage V2 is smaller than the threshold value 1 ("YES" in S21), the control unit 40 outputs, to the receiving-side communication unit 38, a signal for requesting the start of power transmission (S22) because the operation of the control unit 40 (the CPU thereof and the receiving-side communication unit 38) will stop if power transmission continues to be stopped as-is. Upon receiving the signal for requesting the start of power transmission, the receiving-side communication unit 38 transmits a signal for requesting the start of power transmission, to the transmission-side communication unit 25 via the antenna units 26 and 37. Upon receiving the signal for requesting the start of power transmission, the transmission-side communication unit 25 causes the transmission-side control unit 24 to turn on the power switch 23. As a result, power is transmitted from the power supply B to the power transmission coil 21, power is transmitted via the power transmission coil 21 and the power receiving coil 31, and power is supplied to the load L in accordance with the power supply switch 35. In addition, power is supplied from the power line PL to the power storage unit 39 on the control line CL via the power direction restriction unit 44, and the voltage V1 rises in accordance with the amount of power stored in the power storage unit 39.

Next, the control unit 40 determines whether or not the voltage V2 is greater than a threshold 2. Here, the threshold 2 is a voltage that is a predetermined voltage higher than the threshold 1 (a sufficiently high voltage). If the control unit 40 determines that the voltage V2 is greater than the threshold 2 ("YES" in S23), the control unit 40 outputs, to the receiving-side communication unit 38, a signal for suspending the start of power transmission (S24) because there is a possibility that the power storage unit 39 will become overcharged if power transmission is continued as-is. Upon receiving the signal for requesting a stop of power transmission, the receiving-side communication unit 38 transmits a signal for requesting a stop of power transmission, to the transmission-side communication unit 25 via the antenna units 26 and 37. Upon receiving the signal for requesting a stop of power transmission, the transmission-side communication unit 25 causes the transmission-side control unit 24 to turn off the power switch 23. Power transmission from the power supply B to the power transmission coil 21 is thus stopped, power supply to the load L is stopped, and the charging to the power storage unit 39 is stopped.

The operation and effect of the present embodiment will be described.

A power supply system 10 contactlessly supplies power supplied from the power supply B, to a load L in a seat 11 (slidable object) capable of sliding with respect to a body 12A of a vehicle 12. The body 12A of the vehicle 12 includes: a power transmission coil 21 (power transmission unit) capable of transmitting power supplied from a power supply B; a transmission-side communication unit 25 capable of communication; and a transmission-side control unit 24 that controls power transmission of the power transmission coil 21 based on information communicated by the transmission-side communication unit 25. The seat 11 includes: a power receiving coil 31 (power receiving unit) that contactlessly receives power from the power transmission coil 21; a determination unit 41 that determines whether or not to transmit power from the power transmission coil 21 to the power receiving coil 31; a receiving-side communication unit 38 that transmits, to the transmission-side communication unit 25, information indicating a determination as to whether or not to transmit power made by the determination unit 41; and a power storage unit 39 that supplies power to the determination unit 41 and does not supply power to the load L.

According to the above embodiment, the determination unit 41, to which power of the power storage unit 39 is supplied, is capable of determining whether or not to transmit power. Power transmission is performed based on the result of this determination. With this configuration, contactless power supply does not necessarily need to be performed constantly, making it possible to reduce power consumption and suppress electromagnetic noise. Further, the seat 11 does not need to be provided with a power storage unit with a relatively large capacity in order to drive the load L, thus enabling the configuration of the seat 11 to be simplified.

The power storage unit 39 supplies power to the determination unit 41 and the receiving-side communication unit 38.

This configuration eliminates the necessity for contactless power supply for operating the receiving-side communication unit 38. Further, wireless communication can be easily performed with power of the power storage unit 39.

The seat 11 includes an operation unit SW capable of being operated by a user. The determination unit 41 determines whether or not to transmit power from the power transmission coil 21 to the power receiving coil 31 in accordance with an operation of the operation unit SW.

This configuration makes it possible to transmit power from the power transmission coil 21 to the power receiving coil 31 in accordance with an operation of the operation unit SW.

The seat 11 also includes a voltage detection unit 45 capable of detecting a voltage V2 of the power storage unit 39. The determination unit 41 determines that power is to be transmitted from the power transmission coil 21 to the power receiving coil 31 when the voltage detection unit 45 detects that the voltage V2 of the power storage unit 39 has dropped below a predetermined voltage.

This configuration is capable of suppressing malfunctions due to the determination unit 41 or other units stopping operating due to a voltage drop in the power storage unit 39.

The power storage unit 39 stores power received by the power receiving coil 31.

This configuration is capable of suppressing the supply of power from the power storage unit 39 to the load L while allowing power to be stored in the power storage unit 39 when power is transmitted from the power transmission coil 21 to the power receiving coil 31.

OTHER EMBODIMENTS

The technique described in the present specification is not limited to the embodiment described in the above description and the drawings. For example, the following embodiments are also included in the technical scope of the technique described in the present specification.

It has been described that communication between the transmission-side communication unit 25 and the receiving-side communication unit 38 is wireless communication. However, the invention is not limited thereto, and wired communication may alternatively be adopted.

It has been described that the power direction restriction unit is a diode, but the invention is not limited thereto. For example, the power direction restriction unit may be another element or circuit such as a transistor such that the other element or circuit such as a transistor enables power transmission from the power line PL side to the control line CL side and regulates the supply of power from the control line CL side to the power line PL side.

The number of power transmission coils 21 and the number of power receiving coils 31 may be any number. For example, a plurality of power transmission coils 21 (or a plurality of power receiving coils 31) may be arranged side by side.

The above embodiment adopts a method in which contactless power supply is performed using the power transmission coil 21 and the power receiving coil 31. However, the invention is not limited thereto, and any other known contactless power transmitting/receiving method, such as a method using a capacitor, may be used, for example.

It has been described that the slidable object is the slidable seat 11 of the vehicle 12, but the slidable object may alternatively be a slidable door of the vehicle 12.

The invention claimed is:

1. A power supply system for contactlessly supplying power supplied from a power supply, to a load in a slidable object capable of sliding with respect to a body of a vehicle, the body of the vehicle comprising:
   a power transmission unit capable of transmitting power supplied from the power supply;
   a transmission-side communication unit capable of communication; and
   a transmission-side control unit configured to control power transmission of the power transmission unit based on information communicated by the transmission-side communication unit,
   the slidable object comprising:
   a power receiving unit configured to contactlessly receive power from the power transmission unit;
   a determination unit configured to determine whether or not to transmit power from the power transmission unit to the power receiving unit;
   a receiving-side communication unit configured to transmit, to the transmission-side communication unit, information indicating a determination made by the determination unit as to whether or not to transmit power; and
   a power storage unit configured to supply power to the determination unit and does not supply power to the load.

2. The power supply system according to claim 1, wherein the power storage unit supplies power to the determination unit and the receiving-side communication unit.

3. The power supply system according to claim 1, wherein the slidable object further comprises an operation unit capable of being operated by a user, and
the determination unit determines whether or not to transmit power from the power transmission unit to the power receiving unit in accordance with an operation of the operation unit.

4. The power supply system according to claim 1, further comprising:
a voltage detection unit capable of detecting a voltage of the power storage unit,
wherein the determination unit determines that power is to be transmitted from the power transmission unit to the power receiving unit when the voltage detection unit detects that the voltage of the power storage unit has dropped below a predetermined voltage.

5. The power supply system according to claim 1, wherein the power storage unit stores power received by the power receiving unit.

6. The power supply system according to claim 1, wherein the slidable object is a slide seat that is slidably fixed to the body of the vehicle.

7. The power supply system according to claim 2, wherein the slidable object further comprises an operation unit capable of being operated by a user, and
the determination unit determines whether or not to transmit power from the power transmission unit to the power receiving unit in accordance with an operation of the operation unit.

8. The power supply system according to claim 2, further comprising:
a voltage detection unit capable of detecting a voltage of the power storage unit,
wherein the determination unit determines that power is to be transmitted from the power transmission unit to the power receiving unit when the voltage detection unit detects that the voltage of the power storage unit has dropped below a predetermined voltage.

9. The power supply system according to claim 3, further comprising:
a voltage detection unit capable of detecting a voltage of the power storage unit,
wherein the determination unit determines that power is to be transmitted from the power transmission unit to the power receiving unit when the voltage detection unit detects that the voltage of the power storage unit has dropped below a predetermined voltage.

10. The power supply system according to claim 2, wherein the power storage unit stores power received by the power receiving unit.

11. The power supply system according to claim 3, wherein the power storage unit stores power received by the power receiving unit.

12. The power supply system according to claim 4, wherein the power storage unit stores power received by the power receiving unit.

13. The power supply system according to claim 2, wherein the slidable object is a slide seat that is slidably fixed to the body of the vehicle.

14. The power supply system according to claim 3, wherein the slidable object is a slide seat that is slidably fixed to the body of the vehicle.

15. The power supply system according to claim 4, wherein the slidable object is a slide seat that is slidably fixed to the body of the vehicle.

16. The power supply system according to claim 5, wherein the slidable object is a slide seat that is slidably fixed to the body of the vehicle.

* * * * *